United States Patent [19]

Barton et al.

[11] 4,198,651

[45] Apr. 15, 1980

[54] TELEVISION REFERENCE SIGNAL DIGITAL INDENTIFICATION SYSTEM

[75] Inventors: Stephen Barton, Cupertino; Brian Sadler, Sunnyvale, both of Calif.

[73] Assignee: Fairchild Camera and Instrument Corporation, Mountain View, Calif.

[21] Appl. No.: 911,721

[22] Filed: Jun. 1, 1978

[51] Int. Cl.² ............................................. H04N 9/535
[52] U.S. Cl. .................................................. 358/21 V
[58] Field of Search .............................. 358/21 V, 28

[56] References Cited

U.S. PATENT DOCUMENTS

| | | | |
|---|---|---|---|
| 3,780,218 | 12/1973 | Rennick | 358/21 V |
| 4,089,025 | 5/1978 | Banker et al. | 358/21 V |
| 4,092,674 | 5/1978 | Rhodes et al. | 358/28 |

OTHER PUBLICATIONS

*Electronic Servicing,* Jul. 1976, pp. 30–32 "VIR Preview—At Last! Automatic Color," C. Babcoke.
*Radio Electronics,* Nov. 1976, pp. 83–85 "VIR Color Correction from Camera to Pix," R. Kenfield.
*Electronic Technician/Dealer,* Aug. 1976, pp. 14–16, 18, 21 "GE's Broadcast—Controlled Color System Part 1" (No Author).

*Primary Examiner*—George G. Stellar
*Attorney, Agent, or Firm*—Alan H. MacPherson; Ronald J. Meetin; Robert C. Colwell

[57] ABSTRACT

An electronic system for identifying a particular line of a plurality of lines in a pulse field, where, for example, the pulse field is either of the 262.5-line composite sync pulse trains produced by a conventional television receiver and the particular line is line 19 designated to carry a Vertical Interval Reference (VIR) signal, comprises digital circuitries for identifying a particular region corresponding to a known line in the pulse field and for counting from the known line to the particular line. Sensing circuitry determines whether a particular information component such as the VIR signal is present in each pulse field, and digital circuitry generates a presence indication signal when a presence indication criterion is met for the particular information component in a given plurality of fields.

17 Claims, 7 Drawing Figures

TELEVISION REFERENCE SIGNAL DIGITAL INDENTIFICATION SYSTEM

FIELD OF THE INVENTION

This invention relates to an improved digital circuit and automatic control system for a television receiver. More particularly, it relates to such a circuit and system which is capable of achieving improved performance in the operation of a broadcast-controlled automatic control for a given function in the receiver. More especially, it relates to such a digital circuit and system for controlling color intensity and tint in a television receiver automatically through use of a broadcast reference signal on line 19 of a conventional 525 line per frame National Television System Committee (NTSC) broadcast signal.

DESCRIPTION OF THE PRIOR ART

In a conventional color television receiver, the standard practice is to provide manual controls for color and tint, which typically provide a DC signal to the circuitry in the set which establishes color and tint, with the level of the DC signal varying, depending with the setting of the manual color and tint controls. In use, television sets with such manual controls often require considerable trial and error in the settings in order to achieve an esthetically suitable color picture on the screen. For this and related reasons, attention has been devoted to various schemes for providing automatic color and tint controls.

One type of such automatic control which has received some attention is the Vertical Interval Reference (VIR) system, in which a color intensity and tint reference signal is broadcast on line 19 of a conventional American NTSC 525 line per frame broadcast signal. In order to utilize this broadcast reference signal, circuits must be provided in a television receiver for identifying line 19 in the field and establishing whether the VIR signal is being broadcast by the transmitter on the channel to which the receiver is tuned. If the VIR signal is indicated to be present, appropriate circuits assume control of color and tint from the manual color and tint controls. A detailed description of suitable circuits and a system for utilizing the broadcast VIR signal is contained in the "VIR 'Broadcast Controlled' Color System" portion (pp. 21-38) of the GE Technical Training Manual, 1977 Line Television, Stock No. 29-1901-76, obtainable from the General Electric Television Business Department, Portsmouth, VA 23705.

The circuits and system there disclosed sense the presence of a VIR signal in broadcast signals in an analog fashion. Such an analog approach has proved to be suitable in operation where the broadcast signals are strong and the presence of a VIR signal is unambiguous. In actual use conditions, it is well recognized that broadcast signal strength varies depending on the location of the receiver relative to the transmitter, the weather conditions, and even the time of day. With such variations in signal strength, analog circuitry for detecting the presence of a VIR signal causes prior art VIR control systems to assume and relinquish control over color and tint from the manual controls on an erratic and fluctuating basis. In some cases, the VIR control system assumes control from the manual color and tint controls on the basis of a random noise signal observed by the analog detection circuitry on line 19. Such random fluctuation in the assumption and relinquishing of control often produces an objectionable flickering of color and tint visible on the screen as control over color and tint alternates between the VIR automatic control system and the manual color and tint controls. Under such conditions, it would be preferable for a VIR control system to leave the color and tint under manual control.

Thus, while commercially available color television receivers now incorporate automatic control systems, some of which utilize the VIR color intensity and tint reference signals broadcast on line 19, a need remains for further improvement in these systems for marginal signal strength conditions. A need further exists for circuitry that can be used to sense the presence of other reference signals on other lines of a television signal field reliably under marginal signal conditions.

Counters and similar digital circuits have found some applications in television circuits, such as disclosed in Cox et al, Digital Vertical Sync System, IEEE Transactions on Consumer Electronics, Vol. CE-23, No. 3, August 1977, pp. 311-326 and in the counters for identifying line 19 disclosed in the above VIR control system article.

SUMMARY OF THE INVENTION

Accordingly, it is an object of this invention to provide an improved VIR signal detection circuit and VIR automatic control system incorporating such circuit which assumes and relinquishs control of color intensity and tint in an optimum manner under weak signal conditions.

It is another object of the invention to provide a digital detection circuit for detecting the presence of a broadcast reference signal in a television transmission, and a control system incorporating such a digital circuit which assumes control of a function in a television receiver based on the presence of the reference signal.

It is another object of the invention to provide a programmable system of digital circuits which recognizes the presence of a reference signal on any one of selected lines in a field of television signals.

The attainment of the foregoing and related objects, advantages and features of the invention can be obtained through use of the digital television reference signal and circuitry herein disclosed. In this system the presence or absence of a reference signal including the desired information is determined digitally. The system includes means for identifying the line in the broadcast field of a television signal including a plurality of synchronizing signals. In the practice of this invention with a conventional U.S. television receiver, these synchronizing signals are preferably vertical sync pulses. Digitally controlled information signal presence indicating means detects the presence of the information signal at the particular line in the 262.5 line television field, conventionally line 19 in the case of a VIR signal. When a signal is indicated to be present, a manually adjustable control for a function in the television receiver is disabled due to indication of the presence of an information signal by the digitally controlled presence indication means. Means for extracting the information does so from the information signal, and means for utilizing the information controls operation of the function in the television receiver, the manual control of which has been disengaged. In the case of a VIR signal, the television functions involved are color intensity and tint. By determining the presence or absence of a VIR or other reference signal digitally in accordance with this invention, objectionable flickering of the functions to be controlled using the reference signal in the television receiver under marginal signal conditions is avoided.

In particular, the digitally controlled information signal presence indicating means has a counter which is incremented once for each presence of the information signal during a given plurality of fields. The counter is initialized if a predetermined number of the signals is not present during the given plurality of fields. A predetermined increment is required in the counter before the information signal presence indicating means will indicate presence of the signal. In this manner, a repetitive signal pattern must be present for the information signal to be indicated. Thus, the VIR control system is less sensitive to noise and does not assume control of color intensity and tint in response to a noise signal. In particular, it has been determined that the best marginal signal reception can be achieved if the counter requires the presence of the information signal at least two times during a total of six fields, with no more than three consecutive absences of the signal.

The signal presence indication circuitry of this invention is preferably fabricated as a low power Schottky bipolar integrated circuit using the known Isoplanar process. This integrated circuit may then be combined with commercially available sample and hold, operational amplifier and analog switch integrated circuit chips to give a control system incorporating the invention. Such a chip preferably incorporates high impedance inputs and high voltage open collector outputs for easy interfacing with other integrated circuit chips in the system incorporating chip and other components of a television receiver incorporating the system.

A more complete understanding of the present invention will be achieved through the following detailed description of an embodiment in accordance with the invention taken together with the drawings.

DETAILED DESCRIPTION OF THE DRAWINGS

DESCRIPTION OF THE PREFERRED EMBODIMENT

Figure 1:
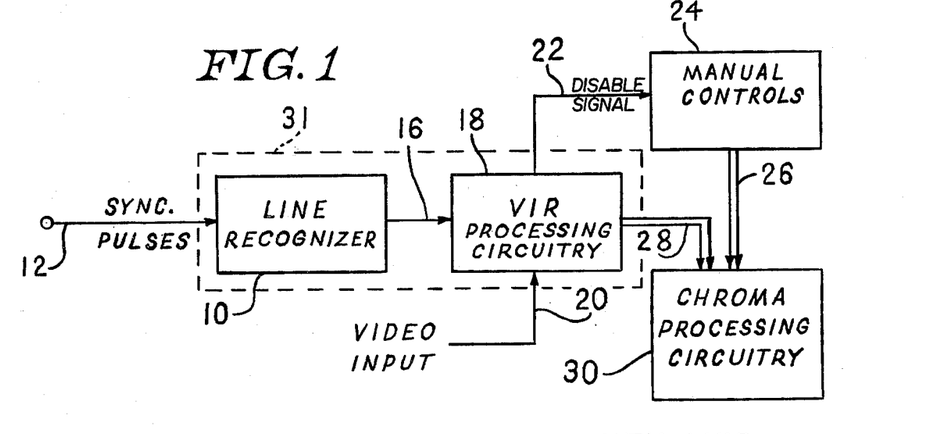
FIG. 1 is a generalized block diagram of a portion of a television receiver showing where the present invention is employed.

Turning now to the drawings, more particularly to FIG. 1, there is shown a block diagram of a portion of a television receiver. A line recognizer 10 receives composite sync pulses on input 12. Line recognizer 10 initiates a count on receiving vertical sync pulses in the composite sync pulse train on input 12, which indicates the beginning of a conventional 262.5 line field. Line recognizer 10 counts in synchronization with the field until line 19 is reached and then sends an enabling signal on connection 16 to VIR processing circuit 18, which detects the presence or absence of a VIR signal during line 19 and extracts the color intensity and tint information therefrom. When VIR processing circuitry 18 detects the presence of a VIR signal during line 19 on video input 20, VIR processing circuitry 18 provides an output signal on connection 22 to disable manual controls 24 to prevent them from providing a color and tint control signal on connections 26. Instead, the VIR processing circuitry 18 extracts the information on the VIR signal on line 19 and utilizes the extracted information to generate color intensity and tint control bias voltages on connections 28 to the chroma processing circuitry 30.

The present invention is concerned primarily with the provision of the VIR sensor portion of the processing circuitry 18 in digital form, and the consequent modifications to line recognizer 10 necessary to allow these two elements to interact properly. A line recognizer and VIR sensor suitable for use in this invention is shown in the generalized block diagram of FIG. 2. This circuitry is preferably provided in integrated circuit form in a single silicon chip, indicated schematically in phantom line form at 31 in FIGS. 1 and 2, fabricated in low power Schottky bipolar technology, using the Isoplanar process. Such a chip can be fabricated with a surface area of 14,000 square mils using layout techniques and ground rules known to those skilled in the art and not forming a part of this invention.

Figure 2:
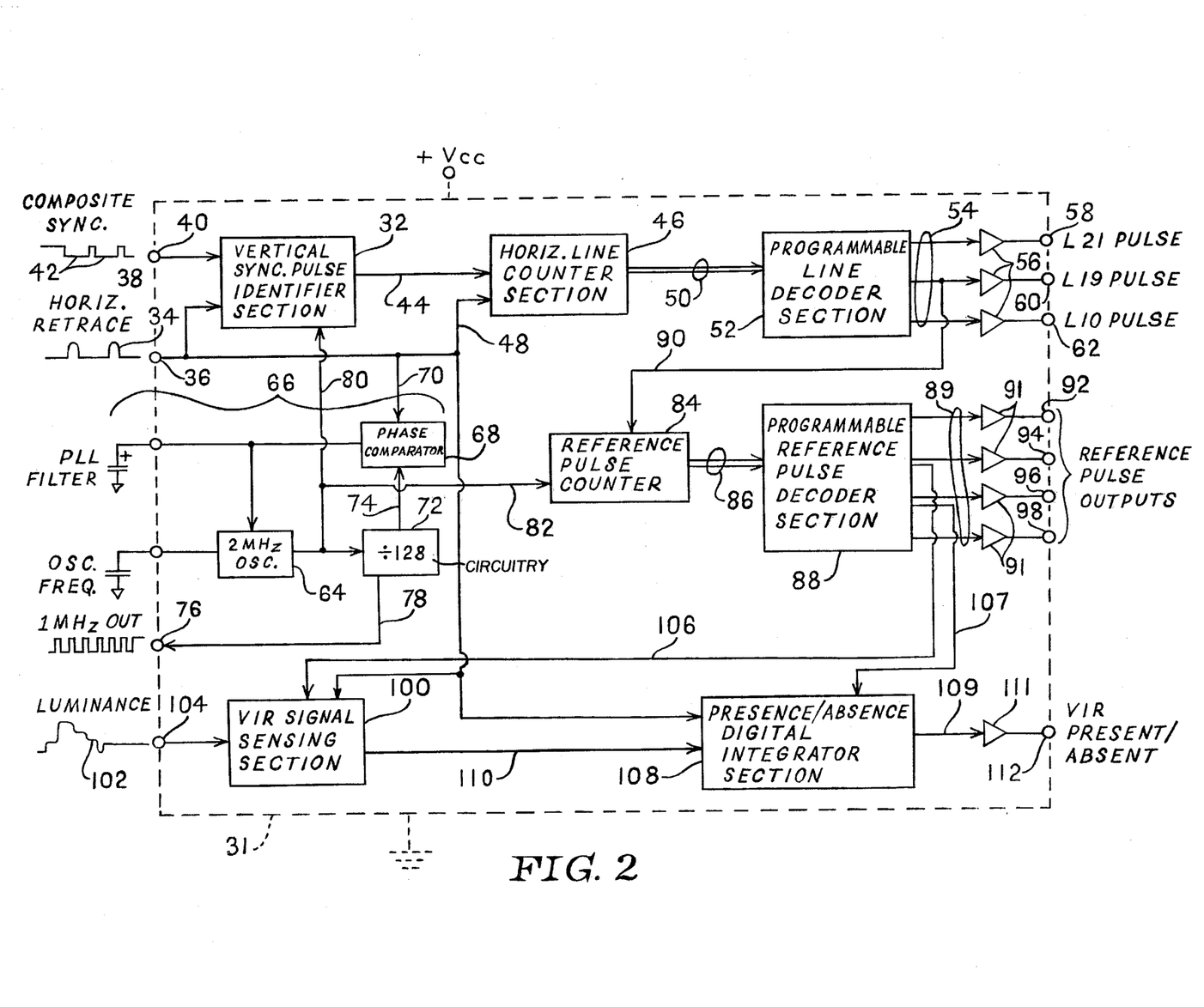
FIG. 2 is a generalized block diagram of a line recognition and VIR signal sensing system in accordance with the invention.

The circuitry in FIG. 2 includes a vertical sync pulse identifier section 32, which is supplied with horizontal retrace pulses 34 at input terminal 36 and a composite sync pulse train 38 at input terminal 40. Suitable logic circuitry examines the composite sync pulse train to detect the presence of the broad vertical sync pulses 42. The logic circuitry then provides an enabling pulse on connection 44 to the horizontal line counter section 46 at the beginning of line 5 in each field. The horizontal line counter section 46 then begins to count the horizontal retrace pules 34 supplied to it on connection 48. Outputs 50 of the horizontal line counter section are connected to the programmable line decoder section 52. In turn, the outputs 54 of the programmable line decoder section 52 are connected through output buffer amplifiers 56 to three dedicated output terminals 58, 60 and 62 of the integrated circuit incorporating the recognizer/sensor circuitry shown. Decoder 52 is programmed in a known manner to supply output pulses on the output terminals 62, 60 and 58, respectively, for three different lines in each field, e.g., lines 10, 19 and 21. In the preferred integrated circuit form of the invention, this programming is desirably accomplished by use of different interconnection mask patterns during fabrication of the integrated circuit. This means that the same basic circuit and system can be used for different functions of the television receiver, depending on the mask programming.

An internal 2.013986 megahertz (MHz) oscillator 64 (shown in the drawings as a 2 MHz oscillator) is used as a source of timing pulses. The frequency of oscillator 64 is locked to a harmonic of the horizontal frequency by a phase locked loop (PLL) 66, using the input horizontal retrace pulses 34 supplied to phase comparator 68 of PLL 66 on connection 70. PLL 66 uses divide-by-128 circuitry 72 in order to obtain the television receiver horizontal frequency of 15.73426 kilohertz (KHz) from the 2.013986 MHz frequency of oscillator 64. The television receiver horizontal frequency is supplied on connection 74 connecting the divide-by-128 circuitry 72 and phase comparator 68. Additionally, a 1.006993 MHz square wave signal is obtained from the first stage of divide-by-128 circuitry 72 and supplied to an output terminal 76 through connection 78 for use as a high accuracy timing signal for external circuitry. Output connections 80 and 82 connect the oscillator 64 to the vertical sync pulse identifier section 32 and the reference pulse counter 84, outputs 86 of which are connected to the programmable reference pulse decoder section 88.

Figure 6:
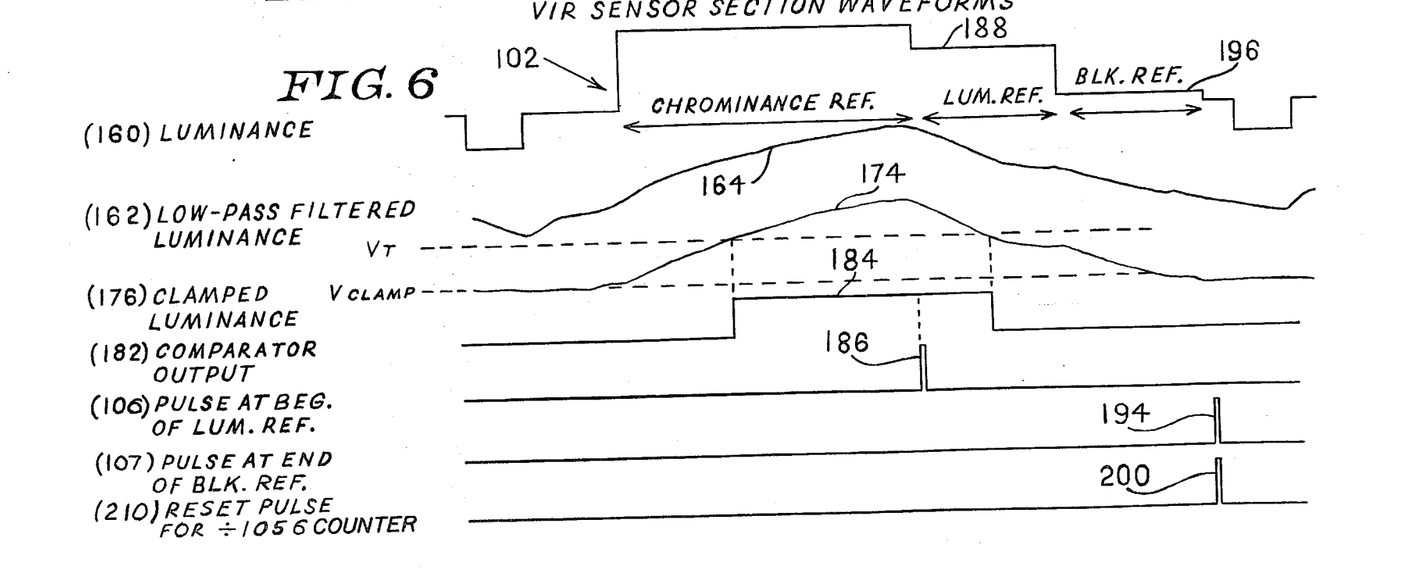
FIG. 6 shows waveforms helpful in understanding the operation of the circuitry shown in FIG. 5 and how it cooperates with the remainder of the system shown in FIGS. 2 and 3.

Depending on the programming of programmable line decoder section 52, when a certain one of the three output pulses is present on connections 54, for example, the line 19 output pulse supplied to terminal 60 in the case of a VIR signal, the reference pulse counter 84 is enabled by means of connection 90. Counter 84 is clocked by oscillator 64, and its output 86 drive the programmable reference pulse decoder section 88. The programming of decoder 88 defines the beginning and end of various reference output pulses with respect to certain numbers of cycles of the 2.013986 MHz oscillator. These reference output pulses are supplied on outputs 89 through buffer amplifiers 91 to four terminals 92, 94, 96, and 98. Again, if line 19 is the chosen line for these output pulses, up to four output pulses corresponding to various portions of the VIR signal containing desired control information may be programmed. An example of such a VIR signal is shown in FIG. 6 of the drawings in idealized form and is explained in further detail below.

VIR signal sensing section 100 is supplied with a luminance signal 102 from the television receiver at input terminal 104. During the line 19 of each field this luminance signal 102 is sampled to determine whether a VIR signal is included in the transmission currently being received by the television receiver. Connection 106, connecting decoder 88 to sensing section 100 provides an appropriate signal to the sensing section 100 during line 19 to identify it. Presence/absence digital integrator section 108 is connected by connection 110 to sensing section 100. The integrator section 108 examines the output of sensing section 100 over a predetermined number of fields and supplies a signal on output 109 through output buffer amplifier 111 to the VIR present/absent output terminal 112 of the integrated circuit. Output terminal 112 is used to drive a VIR transmission indicator light and to control VIR signal processing circuitry (not shown) which extracts the information from the VIR signal for controlling color intensity and tint in a known manner. The digital integrator section 108 is weighted so that a VIR transmission need only be detected as present by sensing section 100 for two fields out of five or better (two out of six if four consecutive signal absent fields are not present) for the VIR present signal to appear at output terminal 112. The transmission must be absent for four consecutive fields for an absence indication to appear. In other words, a VIR signal is indicated as present when first sensed in two fields not separated by four or more fields with an absence of the VIR signal and then remains indicated as present until an absence for at least four consecutive fields has been sensed.

Figure 3:
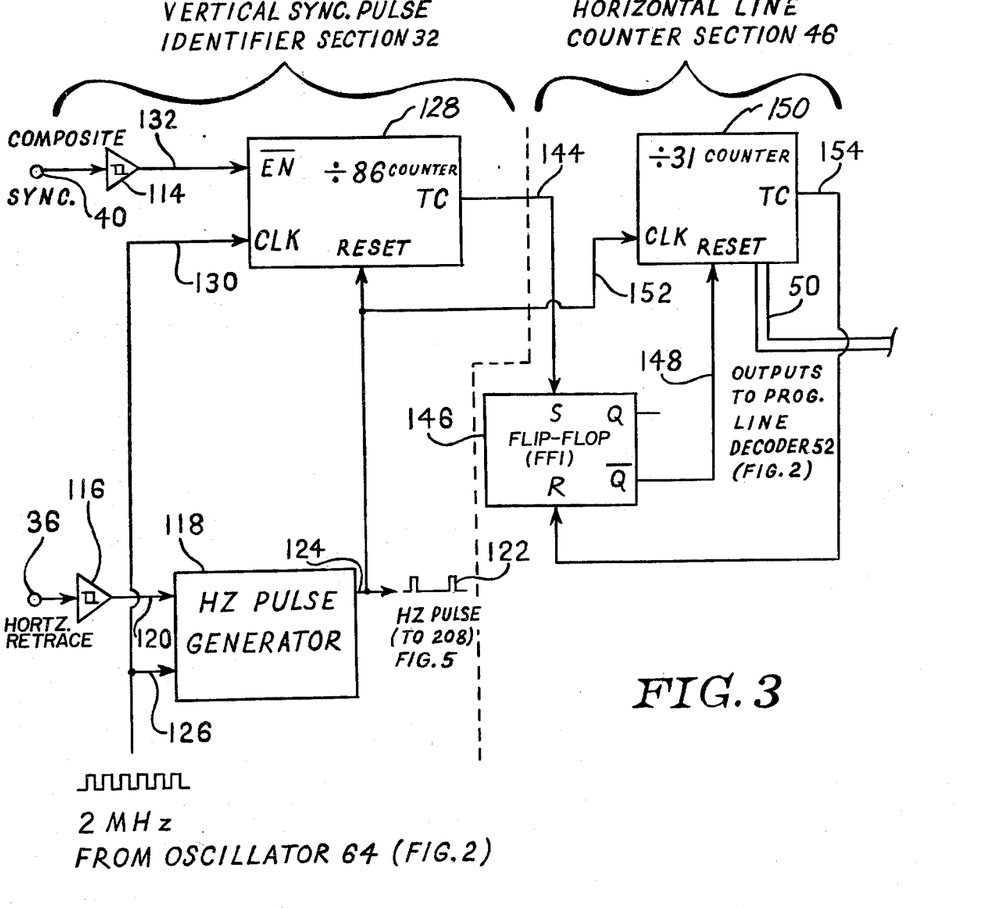
FIG. 3 is a more detailed block diagram of the vertical sync pulse identifier section and the horizontal line counter section of the system in FIG. 2.

FIG. 3 shows a more detailed schematic diagram of the vertical sync pulse identifier section 32 and the horizontal line counter section 46 shown in FIG. 2. The waveforms shown in FIGS. 4A and 4B will aid in an understanding of the circuitry in FIG. 3, and show the waveforms at the beginning of an odd-numbered and an even-numbered field, respectively. The composite sync signals 38 and horizontal retrace signals 34 from the television receiver supplied at input terminals 40 and 36, respectively, first pass through Schmitt trigger stages 114 and 116, respectively, which convert them to digital low and high levels. The horizontal retract pulses 34 then are fed to the HZ pulse generator stage 118 at input 120, which produces HZ pulses 122 at output 124 of HZ pulse generator 118, with a width equal to two cycles of the internal 2.013986 MHz oscillator 64 in FIG. 2, the output of which is supplied to input 126 of HZ pulse generator 118. The HZ pulses are used instead of the horizontal retrace pulses 34 for internal timing and clocking because they have a constant width.

Figure 4A:
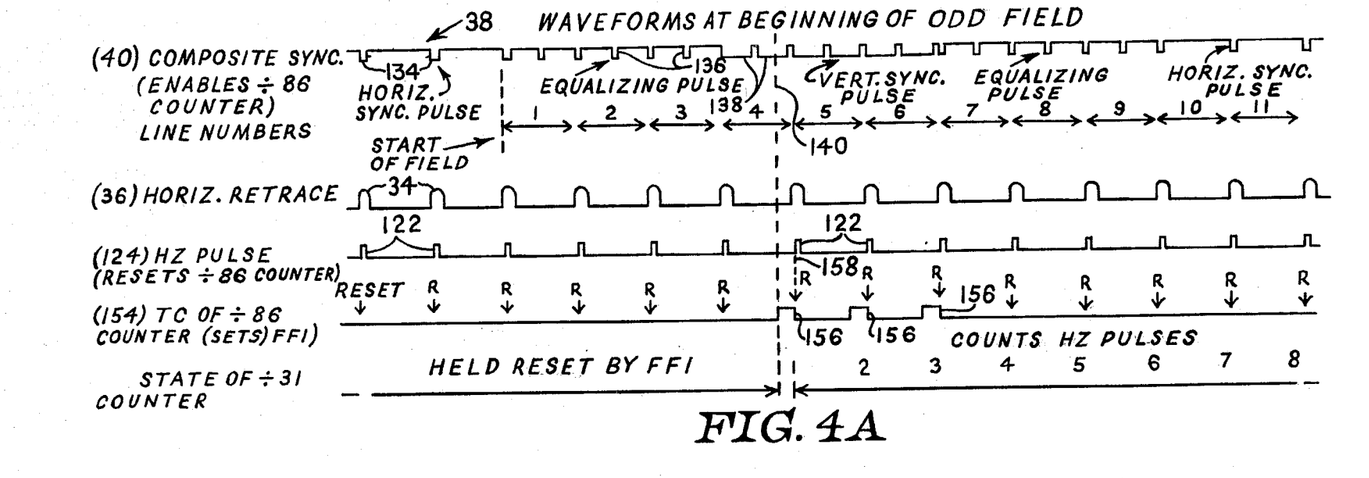
FIGS. 4A and 4B are waveforms useful for understanding the portions of the system shown in FIGS. 2 and 3.
Figure 4B:
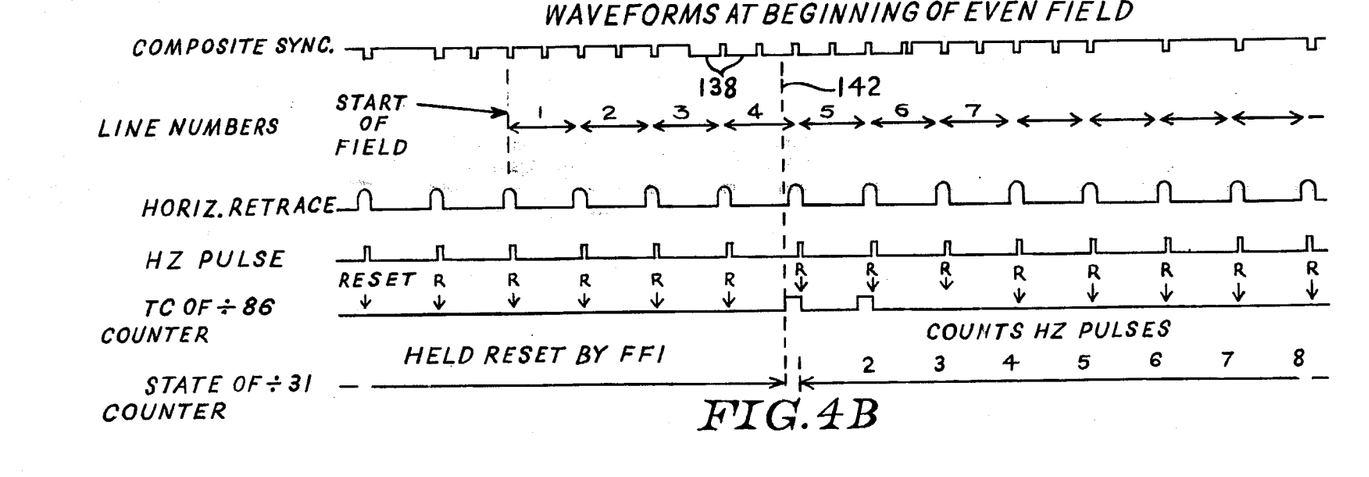

Divide-by-86 counter 128 is reset at the end of each horizontal line by the HZ pulses and is clocked by the 2 MHz oscillator 64, the output of which is supplied to input 130 of the divide-by-86 counter 128. The composite sync signal 38 is supplied to the counter 128 on input 132 to enable the counter 128, so that it only counts when input 132 is at a low level, corresponding to the sync pulse tips. During the relatively narrow horizontal sync pulses 134 and the similarly narrow equalizing pulses 136, divide-by-86 counter 128 does not have sufficient time to reach its terminal count of 86 before it is reset by the next HZ pulse 122. However, the divide-by-86 counter 128 is enabled for a much longer time during line 4 of each field due to the presence of the substantially broader vertical sync pulse 138. A terminal count of 86 was chosen for counter 128 so that the count ends during the second broad vertical sync pulse 138 at the beginning of odd fields as shown in FIG. 4A at 140 or during the third broad vertical sync pulse 138 at the beginning of even fields, as shown at 142 in FIG. 4B.

Output 144 from counter 128 forms one input of flip-flop 146. Flip-flop 146 is often referred to as FFI in the drawings. Output 148 of flip-flop 146 forms a reset input to divide-by-31 horizontal line counter 150. HZ pulses 122 from HZ pulse generator 118 are supplied as a clock input to horizontal line counter 150 on connection 152. Output 154 of horizontal line counter 150 serves as a reset input for flip-flop 146. Outputs 50 of the horizontal line counter 150 are connected to the programmable line decoder section 52 shown in FIG. 2. Flip-flop 146 is normally in its reset position, which means that the divide-by-31 counter 150 is held continuously reset. A terminal count pulse 156 on output 144 of divide-by-86 counter 128 sets flip-flop 146, so that the high level is removed from connection 148 forming the reset input of the divide-by-31 counter 150. Counter 150 is then free to count HZ pulses 122 supplied on connection 152. In operation, counter 150 begins counting with the HZ pulse 122 at the beginning of line 5 of each field, as shown at 158 in FIG. 4A. While divide-by-31 counter 150 is counting HZ pulses 122, any further terminal count pulses 156 from the divide-by-86 counter 128, due to vertical sync pulses during lines 5 and 6 or due to noise pulses, have no effect. The system therefore has total noise immunity for the next 30 lines after a pair of vertical sync pulses has been identified. When divide-by-31 counter 150 reaches its terminal count at the beginning of line 34, its output on connection 154 resets flip-flop 146 and the system is now ready to accept another set of vertical sync pulses 138 to be handled as shown by the waveforms in FIG. 4A or 4B.

Figure 5:
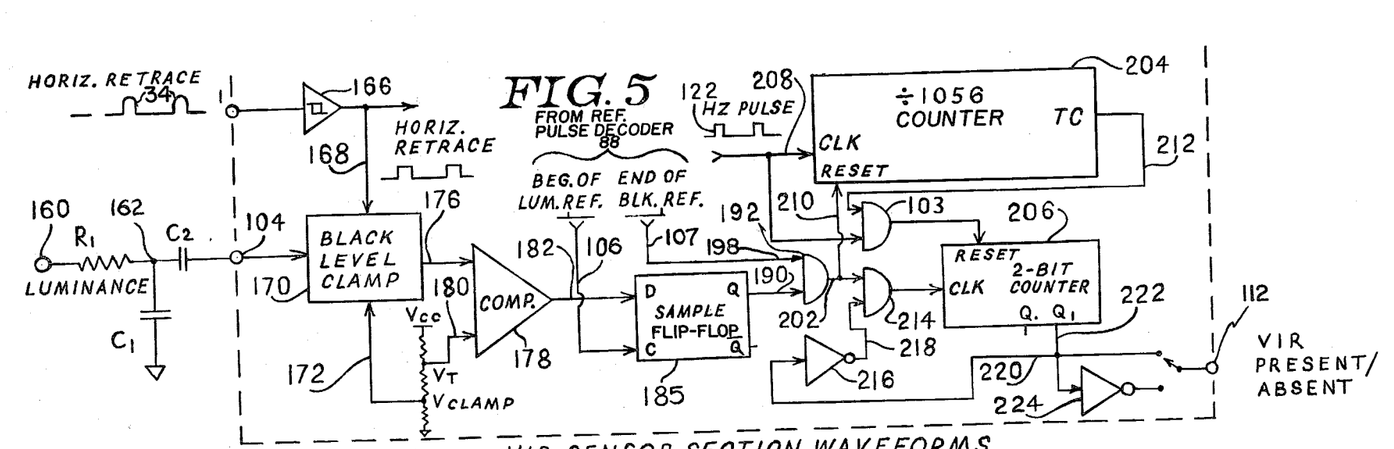
FIG. 5 is another more detailed block diagram of the VIR signal sensing section and the presence/absence digital integrator section in the system shown in FIG. 2.

FIG. 5 is a more detailed block diagram of the VIR signal sensing section 100 and presence/absence digital integrator section 108 shown in FIG. 2. FIG. 6 shows waveforms at various points in the diagram of FIG. 5 useful for understanding its operation. Luminance signal 102 incorporating a VIR signal with chrominance, luminance and black reference levels, as shown in FIG. 6, is applied to node 160 in FIG. 5. External low pass filter R1C1 is used to improve the noise immunity of the circuit and gives the luminance signal at node 162 the form indicated at 164. This signal is AC coupled through capacitor C2 to input terminal 104 shown in FIGS. 2 and 5. Horizontal retrace pulses 34 are supplied through Schmitt trigger 166 to input 168 of black level clamp circuit 170. The horizontal retrace pulses are used by the clamp circuit 170 to clamp the black level of the luminance signal 164 to an internally set voltage supplied on input 172 to clamp circuit 170. The resulting clamped signal 174 is fed on connection 176 to comparator circuit 178, where the voltage $V_{CLAMP}$ of clamped signal 174 is compared to an internally generated DC threshold voltage $V_T$, which is higher than the clamp voltage $V_{CLAMP}$. $V_T$ is supplied on connection 180 to the comparator 178.

When the clamped signal 174 has a level higher than the threshold voltage $V_T$, the comparator output 182 is at a high level, as shown in FIG. 6 at 184. Output 182 of comparator 178 is connected to sample flip-flop 185, which is clocked by a pulse 186 from programmable reference pulse decoder 88 shown in FIG. 2. This pulse 186 on connection 106 corresponds to the beginning of the luminance reference interval 188 of the VIR signal 102. The values of $V_{CLAMP}$ and $V_T$ are arranged so that when a VIR signal 102 is present, the Q output 190 of sample flip-flop 185 is high after sampling if a VIR signal 102 is present and low if it is absent. The Q output at 190 is fed to AND gate 192 along with a pulse 194 corresponding to the end of the black level reference interval 196 of the VIR signal 102. Pulse 194 on connection 107 is generated by the decoder 88 in FIG. 2 and is supplied on connection 198, forming the second input of AND gate 192. If a VIR signal 102 is present, a pulse 200 is produced at output 202 of the AND gate 192.

The portion of FIG. 5 corresponding to digital integrator 108 in FIG. 2 includes a divide-by-1056 counter 204 and a two-bit counter 206. The divide-by-1056 counter 204 counts HZ pulses 122, received at input 208 from the HZ pulse generator 118 in FIG. 3. Unless a reset pulse 200 is supplied on connection 210, the divide-by-1056 counter 204 produces a terminal count pulse on output 212 after 1056 lines, which is slightly more than four fields in a conventional U.S. television signal. Four fields would actually be 1050 lines, but 1056 was chosen for simpler decoding. The two-bit counter 206 is prevented from counting past its "2" state by means of gate 214, which receives reset pulse 200 on connection 202 as one of its inputs. The other input to gate 214 is through buffer inverter 216 on connection 218, derived from a VIR present signal on connection 220. The VIR present signal is on connection 220 whenever output Q1 of two-bit counter 206 on connection 222 is at a high level. The output polarity of a VIR present signal is mask programmable by including or deleting the inverter 224 in the integrated circuit as fabricated. Responsive to the terminal count pulse on output 212 and to HZ pulses 122 from HZ pulse generator 118, AND gate 103 generates a pulse lasting only as long as an HZ pulse as an input to the reset terminal of two-bit counter 206 for resetting two-bit counter 206.

In order for reset pulse 200 to be produced on connection 202, two conditions must be satisfied. First, the line recognizer portion of the system (FIG. 2) must have identified a line 19 or the pulses 186 and 194 would not be produced on connections 106 and 107, respectively. Second, a VIR transmission must be present during the line 19 interval in order for the Q output at 190 to be high. If both of these conditions are satisified, reset pulse 200 appears on connection 202, and the divide-by-1056 counter 204 is reset. Reset pulse 200 must be absent for four consecutive fields before the divide-by-1056 counter 204 reaches its terminal count and resets the two-bit counter 206 to the $Q_1Q_0 = LL$ state, thus producing a VIR absent indication on connection 222, where L is logic low state.

When the two-bit counter 206 is in the LL state, the reset pulse 200 must be present for two fields to count up the counter to the $Q_1Q_0 = HL$ state, where H is logic high state, and give a VIR present indication. After the first pulse 200 with counter 206 in the LL state, the state of counter 206 will be $Q_1Q_0 = LH$. As long as the next pulse 200 occurs during the next four fields, the two-bit counter 206 reaches the $Q_1Q_0 = HL$ state and results in a VIR present indication. However, if a second pulse 200 does not occur during these four consecutive fields, the divide-by-1056 counter 204 reaches terminal count and resets the two-bit counter 206 to $Q_1Q_0 = LL$, which means that the count up process in counter 206 has to start again from the beginning.

By way of example, the following table shows how the circuits described above respond to a television signal with VIR which is weak and subject to fading:

TABLE

| DIGITAL INTEGRATOR OPERATION WITH A FADING SIGNAL | | |
|---|---|---|
| FIELD NUMBER | OUTPUT 190 OF FLIP-FLOP 185 | TERMINAL 112 VIR PRESENT/ABSENT INDICATION |
| 1 | L | NOT DETERMINED |
| 2 | L | NOT DETERMINED |
| 3 | L | NOT DETERMINED |
| 4 | L | ABSENT |
| 5 | H | ABSENT |
| 6 | L | ABSENT |
| 7 | H | PRESENT |
| 8 | L | PRESENT |
| 9 | H | PRESENT |
| 10 | L | PRESENT |
| 11 | L | PRESENT |
| 12 | H | PRESENT |
| 13 | L | PRESENT |
| 14 | L | PRESENT |
| 15 | L | PRESENT |
| 16 | H | PRESENT |
| 17 | L | PRESENT |
| 18 | L | PRESENT |
| 19 | L | PRESENT |
| 20 | L | ABSENT |
| 21 | H | ABSENT |

It can therefore be seen that the circuitry functions as a digital integrator because the VIR present or absent output reflects the presence or absence of the VIR signal over a number of fields. The weighting ratio of two VIR signals present during a total of six fields without four consecutive absences was determined empirically to give optimum performance over a number of different weak signal conditions encountered in practice. It should be noted that the first three fields show no signal was detected, but that condition is ambiguous depending on what was sensed immediately previous. The fourth low state for flip-flop 185 is the first field to give an unambiguous absence in accordance with the preferred weighting scheme of this invention.

In a preferred embodiment of an automatic VIR corrector, the system, in accordance with the generalized block diagram of FIG. 1, is implemented with the integrated circuit of FIG. 2 with commercially available 4016 or 4066 integrated circuits, obtainable from Fairchild Camera and Instrument Corporation, Mountain View, Calif., used both as sample and hold circuits and as analog switches, together with commercially available μ A 3303 quad operational amplifier integrated circuits, obtainable from Fairchild Camera and Instrument Corporation, Mountain View, Calif.

Such a system uses the R−Y color difference signal from the receiver's color demodulator to produce the tint control voltage. It combines the B−Y color difference signal with a luminance (−Y) signal to form a B drive signal, from which it produces the color control voltage. The integrated circuit 31 of FIG. 2 provides pulses to the sample/hold stages during the chrominance reference and black level reference intervals of the line 19 VIR signal. The VIR present/absent output terminal 112 (FIG. 2) of the integrated circuit 31 is used to switch the outputs to the corrector control voltages when a VIR signal is present, or to the front panel manual controls 24 when the VIR signal is absent. Note that the VIR corrector has no effect on the operation of the ACC and color killer circuits of a receiver in which this system is included, since these are not within the closed loop system of which the corrector is a part.

On this basis, the digital approach employed in the present system and circuitry does not respond to a VIR signal which is too weak to give proper information for controlling color intensity and tint. Under such weak signal conditions, outputs are maintained from the circuits operated by manual controls for the television receiver. Objectionable flickering of the color intensity and tint, observed with analog VIR sensing circuits employed in the prior art, is avoided. It thus should be apparent that a system and circuit capable of achieving the stated objects of the invention has been provided.

It should further be apparent to those skilled in the art that various changes in form and details of the invention may be made. For example, the system and circuitry may be either programmed or modified to respond to some other reference signal than a VIR signal on some other line of the television field than line 19. Also, a different weighting ratio to obtain a signal present indication can be utilized. It is intended that such modifications be included within the scope of the claims appended hereto.

What is claimed is:

1. An electronic system for identifying a particular line of a plurality of lines in a pulse train wherein: (1) the train includes a plurality of first pulses within a selected portion of the train and a plurality of second pulses outside the selected portion; (2) each first pulse has a greater pulse width than each second pulse; and (3) selected pulses of the first and second pulses constitute demarcation pulses, each pair of consecutive demarcation pulses demarcating a line of the plurality of lines; said system having (1) means for identifying a particular region corresponding to a known line in the selected portion and for generating an enabling signal indicating identification of the known line and (2) digital means responsive to the enabling signal for counting lines from the known line to the particular line; characterized in that said means for identifying comprises:

first means which receive the pulses of the train for counting from a first initial count to a first specified count and for producing the enabling signal upon reaching the first specified count, said first means (1) enabled for counting only during the time durations of the pulse widths of the pulses of the train when the pulses of the train are received by said first means, (2) reaching the first specified count during the total pulse width of a first number of first pulses, (3) not reaching the first specified count during the total pulse width of a second number of second pulses, and (4) periodically placed at the first initial count in response to first signals at a period which is equal to or greater than the maximum total time encompassed by the first number of first pulses and less than the minimum total time encompassed by the second number of second pulses; and means for periodically generating the first signals.

2. An electronic system for identifying a particular line of a plurality of lines in a pulse train wherein: (1) the train includes a plurality of demarcation pulses, each pair of consecutive demarcation pulses demarcating a line of the plurality of lines, part of the demarcation pulses being in a selected section of the train; (2) the train includes a plurality of intermediate pulses within the selected section, the demarcation pulses within the selected section alternating with the intermediate pulses; and (3) within the selected section is a group of demarcation and intermediate pulses defined collectively as first pulses, the remainder of the pulses in the train defined collectively as second pulses, each first pulse having a greater pulse width than each second pulse; said system having (1) means for identifying a particular region corresponding to a known line in the group and for generating an enabling signal indicating identification of the known line and (2) digital means responsive to the enabling signal for counting lines from the known line to the particular line; characterized in that said means for identifying comprises:

first means which receive the pulses of the train for counting from a first initial count to a first specified count and for producing the enabling signal upon reaching the first specified count, said first means (1) enabled for counting only during the time durations of the pulse widths of the pulses of the train when the pulses of the train are received by said first means, (2) reaching the first specified count during the total pulse width of a first number of first pulses, and (3) not reaching the first specified count during the total pulse width of a second number of second pulses, and (4) periodically placed at the first initial count in response to first signals at a period which is equal to or greater than the maximum total time encompassed by the first number of first pulses and less than the minimum total time encompassed by the second number of second pulses; and means for periodically generating the first signals.

3. In a television receiver, a system for identifying a particular line of a plurality of lines in a pulse field wherein the field includes a plurality of vertical sync first pulses extending substantially across a selected portion of a selected section of the field, a plurality of equalizing pulses within the selected section outside the selected portion, and a plurality of horizontal sync pulses extending substantially across the field outside the selected section; the lines being demarcated by pairs of consecutive horizontal sync pulses, by selected pairs of alternate equalizing pulses, and by selected pairs of alternate first pulses; the horizontal sync pulses and the equalizing pulses defined collectively as second pulses, each first pulse having a greater pulse width than each second pulse; said system having (1) means for identifying a particular region corresponding to a known line in the selected portion and for generating an enabling signal indicating identification of the known line and (2) digital means responsive to the enabling signal for counting lines from the known line to the particular line; characterized in that said means for identifying comprises:

first means which receive the pulses of the field for counting from a first initial count to a first specified count and for producing the enabling signal upon reaching the first specified count, said first means (1) enabled for counting only during the time durations of the pulse widths of the pulses of the field when the pulses of the field are received by said first means, (2) reaching the first specified count during the total pulse width of a first number of first pulses, (3) not reaching the first specified count during the total pulse width of a second number of second pulses, and (4) periodically placed at the first initial count in response to first signals at a period which is equal to or greater than the maximum total time encompassed by the first number of first pulses and less than the minimum total time encompassed by the second number of second pulses; and means for periodically generating the first signals.

4. A system as in claim 3 wherein the lines are all of substantially the same length in time.

5. A system as in claim 3 wherein the field is either of the 262.5-line composite sync pulse trains produced by a conventional television receiver.

6. A system as in claim 5 further characterized by the particular line being line 19.

7. A system as in claim 5 characterized in that the known line is the same line for both of the 262.5-line composite sync pulse trains.

8. A system as in claim 3 further characterized in that said means for periodically generating comprises a pulse generator responsive to horizontal retrace signals from the television receiver.

9. A system as in claim 1, 3, or 8 further characterized by the period being substantially equal to the time between the beginnings of consecutive lines.

10. A system as in claim 9 further characterized in that said digital means are not responsive to a signal from said means for identifying during a selected time interval subsequent to the enabling signal.

11. A system as in claim 10 further characterized in that said digital means comprises:

bistable means (1) responsive to a second signal for generating a first intermediate signal until said bistable means is placed in a first state of two stable states, the second signal placing said bistable means in the second state of the two stable states, and (2) responsive to the enabling signal for generating a second intermediate signal, the enabling signal placing said bistable means in the first state; and second means (1) responsive to the first intermediate signal for placing said second means at a second initial count, (2) responsive to the second intermediate signal for enabling said second means, and (3) responsive to the first signals after being enabled for counting at one counting increment per first signal from the second initial count through an intermediate count to a second specified count, said second means generating (1) an identification signal when the intermediate count is reached and (2) the second signal when the second specified count is reached.

12. In a television receiver and the like, a system for examining pulse fields to determine whether a particular information component is present on a particular line of a plurality of lines in each pulse field and for generating a presence indication signal when a presence indication criterion is met for the particular information component in a given plurality of pulse fields and for generating an absence indication signal when the presence indication criterion is not so met, said system comprising:

sensing means for examining each pulse field to determine whether the particular information component is present on the particular line and for generating a presence signal whenever said sensing means indicate the particular information component as present on the particular line; and digital means comprising: (1) first means for counting each pulse field for which no presence signal is generated up to a first number of pulse fields for which no presence signals are generated, said first means being initialized in response to a presence signal and; (2) second means for counting each presence signal up to a second number of presence signals, said second means being initialized whenever said first means is at the first number; said digital means (1) generating the presence indication signal when said second means is at the second number and said first means is not at the first number and (2) generating the absence indication signal when said second means is not at the second number.

13. In a television receiver and the like, a system for examining pulse fields to determine whether a particular information component is present on a particular line of a plurality of lines in each pulse field and for generating a presence indication signal when a presence indication criterion is met for the particular information component in a given plurality of pulse fields and for generating an absence indication signal when the presence indication criterion is not so met, said system having sensing means for examining each pulse field to determine whether the particular information component is present on the particular line and for generating a presence signal whenever said sensing means indicate the particular information component as present on the particular line; characterized as including digital means comprising: (1) first means for counting each pulse field for which no presence signal is generated up to a first number of pulse fields for which no presence signals are generated, said first means being initialized in response to a presence signal and; (2) second means for counting each presence signal up to a second number of presence signals, said second means being initialized whenever said first means is at the first number; said digital means (1) generating the presence indication signal when said second means is at the second number and said first means is not at the first number and (2) generating the absence indication signal when said second means is not at the second number.

14. A system as in claim 13 further characterized in that the first number is four and the second number is two, the presence indication criterion thereby being that at least two presence signals must be generated with no more than three consecutive pulse fields for which no presence signals are generated separating the pulse fields for which the at least two presence signals are generated.

15. A system as in claim 13 further characterized in that:

said first means (1) is operable for incrementing at one counting increment per line from a first initial count to a first specified count corresponding to the first number, (2) is placed at the first initial count responsive to a presence signal, and (3) generates an initializing signal upon reaching the first specified count; and said second means (1) is operable for incrementing at one counting increment per presence signal from a second initial count to a second specified count corresponding to the second number, (2) is placed at the second initial count responsive to the initializing signal, (3) generates the presence indication signal when at the second specified count, and (4) generates the absence indication signal when not at the second specified count.

16. A system as in claim 13 further characterized in that said digital means further includes gate means for preventing said second means from incrementing beyond the second specified count.

17. A system as in claim 16 further characterized in that said gate means comprises: an inverter for generating an inverted signal from either the presence indication signal or the absence indication signal; and an AND gate responsive to the inverted signal and to a presence signal for generating a counting signal; said second means incrementing in response to receiving the counting signal.

* * * * *